BEST AVAILABLE COPY
No. 12,241.
REISSUED JULY 19, 1904.
W. B. POTTER.
CONTROLLER FOR ELECTRIC MOTORS.
APPLICATION FILED JUNE 21, 1904.
6 SHEETS—SHEET 1.
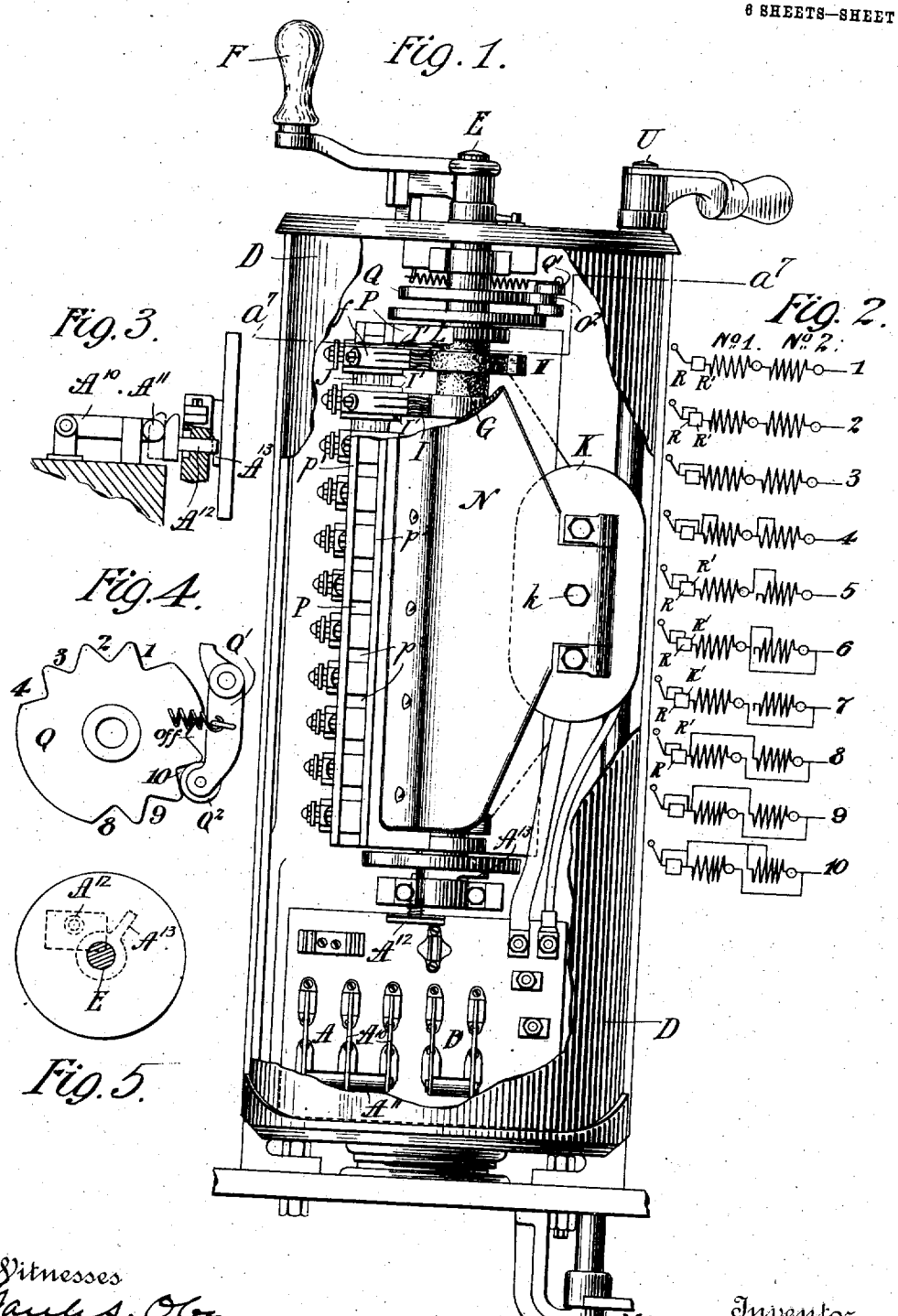
Witnesses
Frank S. Ober
Wm. H. Davis
Inventor
WILLIAM B. POTTER,
By his Attorneys
Betts Potts Hoffman & Betts BEST AVAILABLE COPY
No. 12,241.
REISSUED JULY 19, 1904.
W. B. POTTER.
CONTROLLER FOR ELECTRIC MOTORS.
APPLICATION FILED JUNE 21, 1904.
6 SHEETS—SHEET 2.
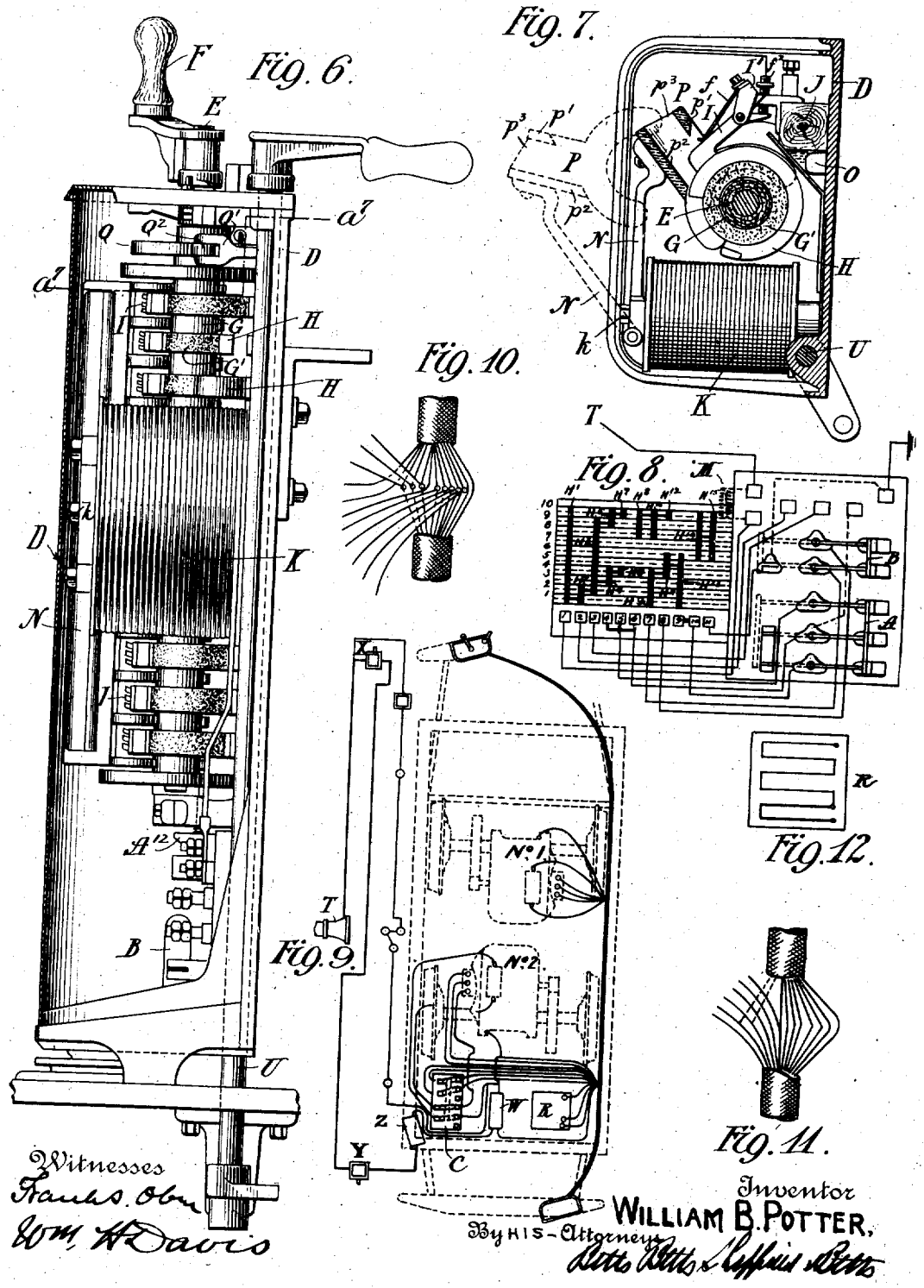
Witnesses
Frank S. Ober
Wm. H. Davis
Inventor
WILLIAM B. POTTER,
By his Attorneys
Betts, Betts & Baffin & Betts

BEST AVAILABLE COPY

No. 12,241.

REISSUED JULY 19, 1904.

W. B. POTTER.

CONTROLLER FOR ELECTRIC MOTORS.

APPLICATION FILED JUNE 21, 1904.

6 SHEETS—SHEET 3.

Witnesses
Frank S. Ober
Wm H Davis

Inventor
WILLIAM B. POTTER,
By his Attorneys
Betts, Betts, Sheffield & Betts

BEST AVAILABLE COPY

No. 12,241.

REISSUED JULY 19, 1904.

W. B. POTTER.

CONTROLLER FOR ELECTRIC MOTORS.

APPLICATION FILED JUNE 21, 1904.

6 SHEETS—SHEET 4.

Witnesses
Charles S. Obrien
Wm. H. Davis

Inventor,
WILLIAM B. POTTER,
By his Attorneys,
Otto Otto Hoffman & Otto

BEST AVAILABLE COPY
No. 12,241.
REISSUED JULY 19, 1904.
W. B. POTTER.
CONTROLLER FOR ELECTRIC MOTORS.
APPLICATION FILED JUNE 21, 1904.
6 SHEETS—SHEET 5.
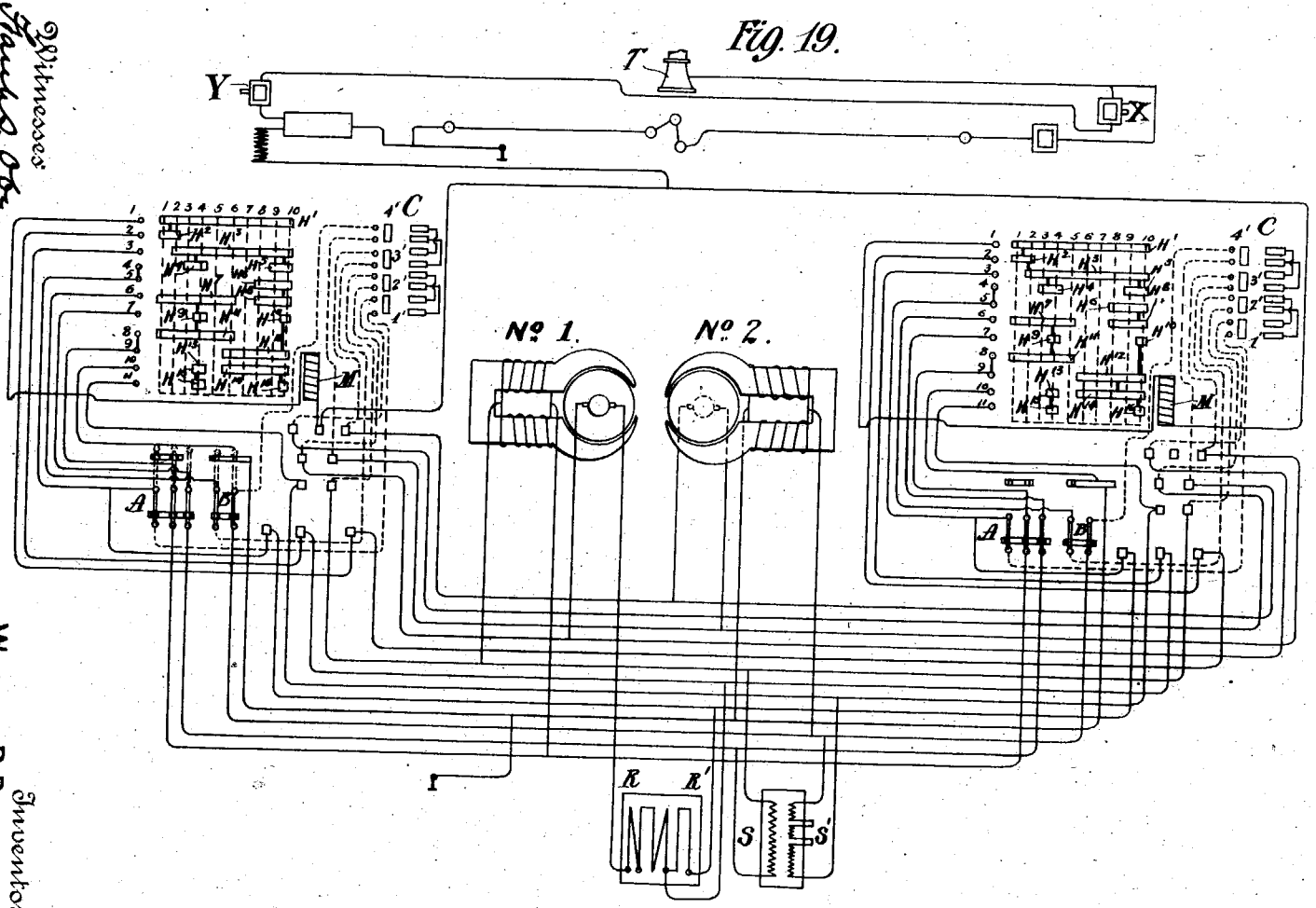
Witnesses
Frank S. Obrien
Wm. H. Davis
Inventor
WILLIAM B. POTTER,
By his Attorneys
Betts, Betts & Kupfrian BEST AVAILABLE COPY
No. 12,241.
REISSUED JULY 19, 1904.
W. B. POTTER.
CONTROLLER FOR ELECTRIC MOTORS.
APPLICATION FILED JUNE 21, 1904.
6 SHEETS—SHEET 6.
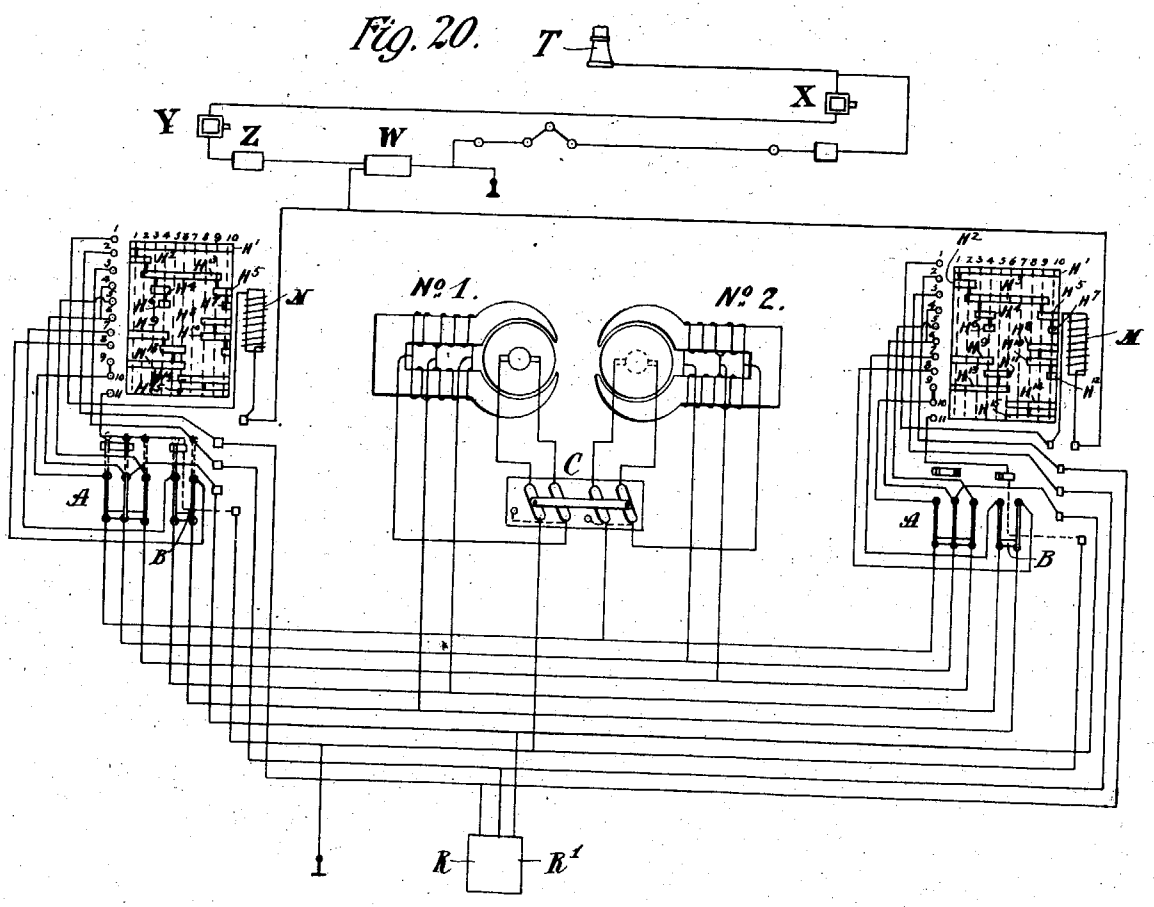
Witnesses
Frank S. Obern
Wm. H. Davis
Inventor,
WILLIAM B. POTTER,
By his Attorneys
Betts Betts Hoffman & Betts No. 12,241. Reissued July 19, 1904.

BEST AVAILABLE COPY

UNITED STATES PATENT OFFICE.

WILLIAM B. POTTER, OF SCHENECTADY, NEW YORK, ASSIGNOR TO THE GENERAL ELECTRIC COMPANY, OF BOSTON, MASSACHUSETTS, A CORPORATION OF NEW YORK.

CONTROLLER FOR ELECTRIC MOTORS.

SPECIFICATION forming part of Reissued Letters Patent No. 12,241, dated July 19, 1904.

Original No. 524,396, dated August 14, 1894. Application for reissue filed June 21, 1904. - Serial No. 213,580.

*To all whom it may concern:*

Be it known that I, WILLIAM B. POTTER, a citizen of the United States, residing at Schenectady, county of Schenectady, State of New York, have invented certain new and useful Improvements in Controllers for Electric Motors, of which the following is a specification.

My invention is illustrated in the accompanying drawings, in which—

Figure 13:
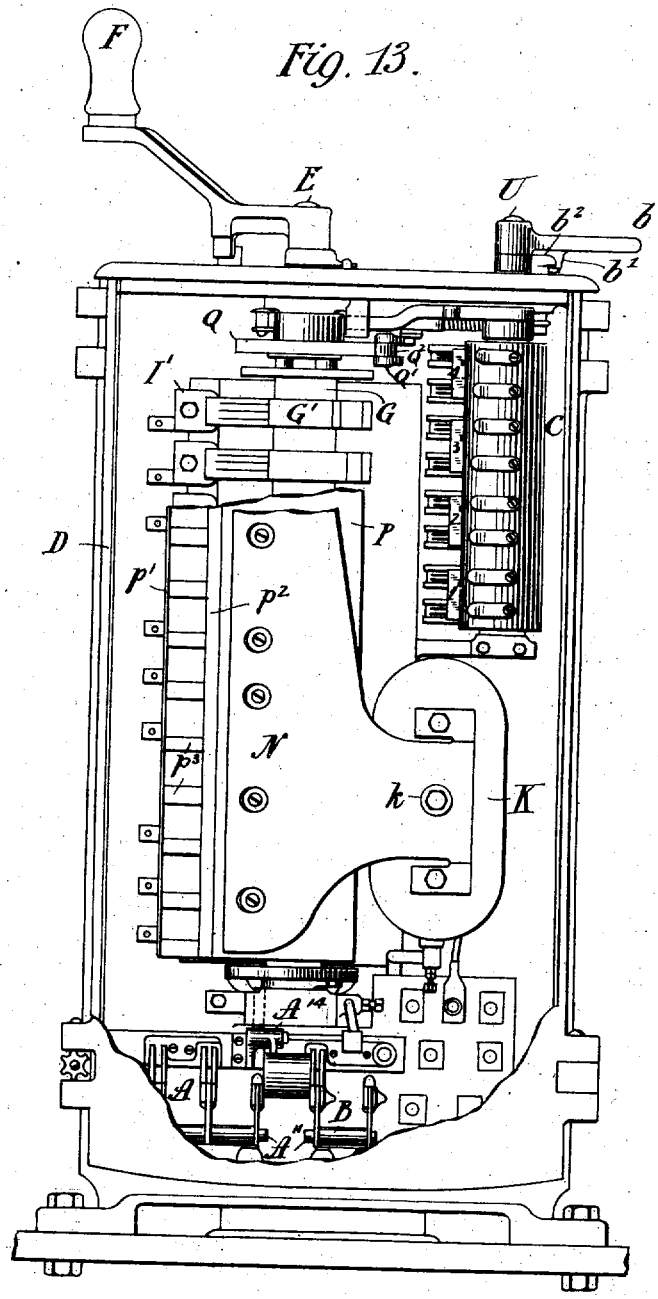
Figure 14:
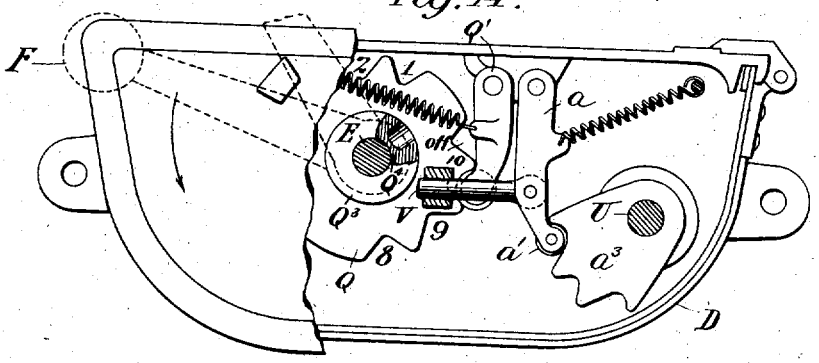
Figure 15:
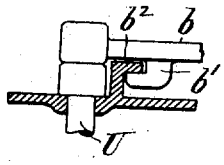
Figure 16:
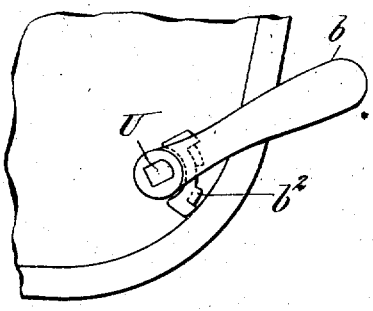
Figure 17:
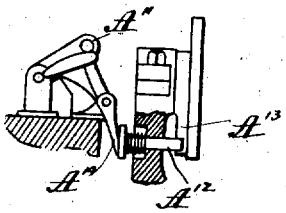
Figure 18:
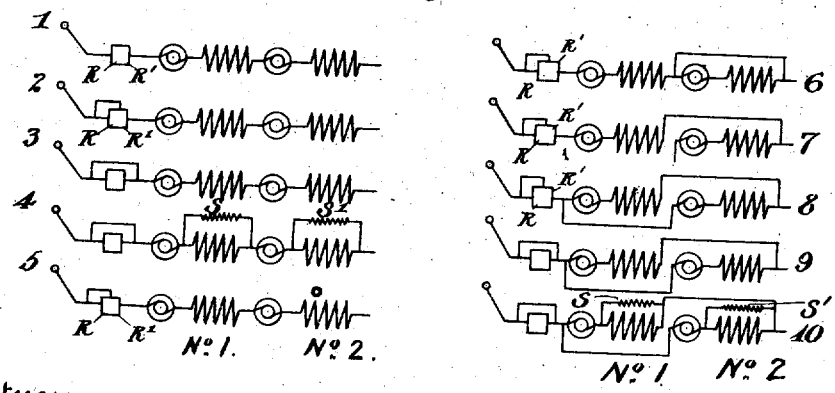

Figure 1 is an elevation, partly in section, of my controller. Fig. 2 is a series of diagrams showing several circuit connections established under the various conditions of the controller. Figs. 3, 4, and 5 are details. Fig. 6 is a side elevation, partly in section, of the controller. Fig. 7 is a horizontal section on the line $a^7$ $a^7$ of Fig. 1. Fig. 8 is a plan of the contact-cylinder and switch. Fig. 9 is a diagram showing my controller applied to an electric tram-car so that the same may be operated from either end. Figs. 10, 11, and 12 are details. Fig. 13 shows a modified form of the invention. Fig. 14 shows an alternative form of locking device. Figs. 15 and 16 are details of the same. Fig. 17 is a detail of the cut-out lock. Fig. 18 is a series of circuit connections produced by my alternative form of controller. Figs. 19 and 20 are diagrams of circuits upon a more extended scale.

My invention relates to a controller known as a "series-parallel controller," by which two or more electric motors acting upon a common load—as, for instance, an electric locomotive—may be coupled either in series or in parallel in order to give various degrees of speed and power to the driven mechanism.

My invention relates especially to the form of series-parallel controller invented by W. H. Knight and myself, illustrated and described in Patent No. 587,441, of August 3, 1897, the characteristic feature of said controller being that the motors are first placed in series with a resistance, the resistance is then cut out and the motors changed from series to parallel by first shunting one motor, leaving the other motor in series with a resistance, and then placing the two motors in parallel, further regulation being effected by modifying the field-magnet strength. The improvements which I have made are, first, a modification of the magnet used to extinguish arcs on the contact-terminals; second, the application of insulating septa to the contact-surface against which the arcs are driven; third, an arrangement of the device by which one motor may be cut out and the controller used to regulate the remaining motor; fourth, the attachment of a locking device by which it is impossible to operate the reversing-switch except at a time when the controller is in the proper condition; fifth, an improved reversing-switch placed in the same box with the controller; sixth, means for detaining the switch at certain points selected as working positions, and, lastly, certain details which will be hereinafter described and claimed.

Referring to the drawings, it will be apparent that my controller consists in general of a switch of the cylinder type, the rotation of which produces various combinations of the circuits terminating at the switch. The circuit-terminals consist of a series of stationary contact-springs placed in a line parallel with the axis of the cylinder and bearing upon suitable contact rings or plates, which are fastened to the cylinder so as to be rotated therewith and suitably insulated therefrom. This switch is inclosed in a suitable case provided with an external handle for rotating the cylinder.

In Figs. 1, 6, 7, and 13, D is the inclosing case, which is rectangular in shape, having one flat side adapted to be placed in position against the dashboard of a car or against any suitable supporting-wall.

E is the shaft of the cylinder, adapted to be operated by the main handle F.

G is an insulating-cylinder having a series of insulating-rings G', upon which are fastened contact-plates H. These conducting-plates are annular in shape and form more or less complete rings, upon which a series of contact-fingers respectively bear.

The contact-fingers are marked I, and, as shown in Fig. 7, are each pivoted in a bracket I', which is attached to an insulating-block J and forms a circuit-terminal, a binding-post being attached thereto for connecting a line-wire. They are, as shown, composed of strips of metal having a kink or bend L in their length, by which the furrowing or grooving of the contact-strips is prevented. A spring $f$ constantly presses the contact-finger against the contact-plate H, and the range of movement of the finger is regulated by an adjusting-screw $f^2$. It is obvious that as the cylinder is turned a greater or less number of the fingers will be bearing upon the contact-plates at any one time and that if suitable connection is made between certain ones of the contact-plates the turning of the cylinder will establish a definite series of connections between the circuits which terminate at the respective contact-fingers I.

For interrupting any arc which may be formed upon breaking contact between any of the fingers I and the contact-plates H, I have provided an electromagnet K, which is placed in the inclosing case adjacent to the switch-cylinder at its middle point and which is provided with a pivoted pole-piece N, extending laterally in each direction from the core of the magnet and terminating at a point adjacent to the line of contact-fingers I. The opposite end of the magnet-core rests against the back plate of the inclosing case, so that the latter forms a part of the magnetic circuit. A ridge O is cast on the back plate of the inclosing case D at a point opposite the pivoted pole-piece N. Carried by the pole-piece N is a box P, (see Figs. 1 and 7,) constructed of two longitudinally-extending strips $p'$ $p^2$, of insulating material. Supported between these two strips $p'$ and $p^2$ are a series of insulating septa $p^3$, having extensions shaped, as shown in Fig. 7, to conform to the curvature of the cylinder and adapted when the pole-piece N is in the position shown in full lines to lie between the several contact-plates H.

The operation of this arc-interrupting device is as follows: Any arcs which occur between the contact-plate H and the fingers I are forcibly driven by the magnetic field against the insulating septa or deflectors $p^3$, which are placed transversely to the line in which the arc is blown by the magnet, and said arcs are thereby spread out on the surfaces of said septa or deflectors and cooled or smothered. The insulating-strips $p'$ $p^2$ serve to confine the heated gases constituting the arcs, and the chutes formed by the septa $p^3$ and the strips $p'$ $p^2$ carry the heated gases away from the switch-cylinder. The whole arrangement serves to confine and extinguish the arcs in the limited space available in a compact controller. The pivoted pole-piece N and the parts carried thereby may be swung outward, as indicated in dotted lines in Fig. 7, so as to give ready access to the interior of the mechanism. It is, however, normally held in position by the set-screw $k$. In operating the controller it is desirable that there should be some means of noting the different positions of the switch where definite combinations of circuits are produced, and for this purpose I in some cases simply attach to the cylinder a star-wheel Q (shown in detail in Fig. 4) and provide a spring-pressed lever Q′, carrying a friction-wheel $Q^2$, bearing in the notches of the star-wheel. The notches of the wheel will be so shaped that a small amount of force will be required to turn the cylinder against the pressure of lever Q′ upon its periphery, and the cylinder will naturally come to rest at those positions in which the friction-wheel $Q^2$ rests in the notches. I usually prefer to combine with this device a lock for the reversing-switch. This switch is operated by a separate shaft U, passing through inclosing case D parallel with the cylinder-shaft E. The switch itself may be placed in the same casing with the switch-cylinder, as shown in Fig. 13, or it may be placed at a distant point, in which case the shaft U passes directly through the inclosing case, as in Fig. 1, and at its lower end is provided with connecting devices leading to the reversing-switch. In either case the locking device can be used, an arrangement for this purpose being shown in Fig. 14. The star-wheel Q in this case has attached to it a disk $Q^3$, in which is a socket $Q^4$. This socket is adapted to receive one end of a bolt V when it is rotated to a point opposite the end of the bolt. The other end of the bolt V is pivoted to a lever $a$, which carries a friction-wheel $a'$, engaging a notched cam $a^3$ on shaft U. The lever $a$ bears against the cam $a^3$ substantially as the lever Q′ bears against the periphery of star-wheel Q; but the cam can only be turned when the end of the bolt V is opposite the socket $Q^4$, so as to be forced into it by the rotation of shaft U and the consequent action of cam $a^3$ upon lever $a$.

There is only one position of the star-wheel which will bring the socket $Q^4$ into line with bolt V, and that position is the one in which the handle F is in the upper extreme position, (shown in dotted lines in Fig. 14,) the lower extreme position being shown by dotted lines in the same figure, and the two positions indicated show the full range of movement of the handle in both directions, respectively. In the former position the motor-circuit is broken, and the reversing-switch can be turned to its intermediate position with the circuit broken. The friction-wheel $a'$ rests then in the middle notch of cam $a^3$ and it will be impossible to turn handle F, as at that time the bolt V is in socket $Q^4$. When, however, the reversing-switch is turned in one or the other of its two positions, the bolt V will be withdrawn and the handle F can be turned. There is also provided a removable handle for the shaft U, which, however, can only be taken off when the reversing-switch is in its middle position with the circuit broken. In

BEST AVAILABLE COPY

Figs. 15 and 16, $b$ is the handle, which has a lug $b'$ extending under a flange $b^2$ on the cover of the inclosing case. This flange $b^2$ is cut away at its center, so that handle $b$ when in its intermediate position can be lifted off. The object of the locking apparatus thus described is to insure that the controller at one end of the car is left locked with the circuit broken both at the reversing-switch and at the switch-cylinder and also to prevent reversals of the motors except when the circuit is broken. As only one handle is provided for each car and there is a controller at each end of the car, it is necessary for the driver when leaving one end of the car to throw his switch to the middle position before he can remove the handle and proceed with it to the opposite end of the car, and, as above described, when in its middle position the reversing-switch is open and the switch-cylinder locked. Upon removing the handle and proceeding to the opposite end of the car it is necessary for him to first throw his reversing-switch in one direction or the other before he can operate his switch-cylinder to control the car.

In Fig. 2 I have shown a series of diagrams illustrating the successive connections which are established by my controller. These may be modified somewhat—as, for instance, to the series shown in Fig. 18—but the only difference between the two is that the field-magnet strength in the former case is varied by short-circuiting a part of the coils and in the latter case by shunting them with a resistance. Either method may be employed. It is hardly necessary to describe in detail the route of the current in each position of the controller, as it will be readily understood by any one skilled in the art how the contact-plates of the switch-cylinder may be suitably arranged to produce the combination shown in Fig. 2 or any other combination which may be desired. I have, however, to avoid any uncertainty shown in Fig. 8 a plan of the switch-cylinder as arranged to produce the combinations of Fig. 2. In said Fig. 8 the contact-fingers I are numbered from 1 to 11, inclusive, and the heavy vertical lines indicate the respective contact-plates H, while the successive positions of the fingers on the plates are indicated by the dotted horizontal lines numbered from 1 to 10. The plates H are interconnected, as indicated in the figure.

Of Fig. 9 it may also be stated that the two motors marked, respectively, "No. 1" and "No. 2" are geared to opposite axles of a railway-car, and the two controllers on the two ends of the car, respectively, are joined by a cable containing a number of wires, and from intermediate points of the cable connections are taken out to the motors, reversing-switches, &c.

Fig. 20 is a general diagram combining the partial diagrams of Figs. 8 and 9. Referring to diagram Fig. 20, with the brushes on the line 1 1, the circuit will be as follows: trolley T, switches X and Y, to cut-out Z, to lightning-arrester W, to magnet M, to brush 1, to block H′, cross-connected to block $H^3$, to brush 2, through the resistances R R′, to switch A, to field of motor No. 1, to reversing-switch C, to armature of motor No. 1, to reversing-switch C, to switch A, to brush 10, connected to brush 9, to block $H^{13}$, cross-connected to block $H^9$, to brush 7, to switch B, to field of motor No. 2, to reversing-switch C, to armature of motor No. 2, to reversing-switch C, to ground. With the circuits arranged as above the two motors are in series with all the resistance in.

With the brushes on the line 2 2 the circuit will be as follows: trolley T, switches X and Y, to cut-out Z, to lightning-arrester W, to magnet M, to brush 1, to block H′, cross-connected to block $H^3$, to brush 3, to resistance R′, to switch A, to field of motor No. 1, to reversing-switch C, to armature of motor No. 1, to reversing-switch C, to switch A, to brush 10, connected with brush 9, to block $H^{13}$, cross-connected to block $H^9$, to brush 7, to switch B, to field of motor No. 2, to reversing-switch C, to armature of motor No. 2, to reversing-switch C, to ground. With the circuits arranged as above the two motors are in series with a part of the resistance cut out.

With the brushes on the line 3 3 the circuit will be as follows: trolley T, switches X and Y, to cut-out Z, to lightning-arrester W, to magnet M, to brush 1, to block H′, cross-connected to block $H^4$, to brush 4, connected to brush 6, to switch A, to field of motor No. 1, to reversing-switch C, to armature of motor No. 1, to reversing-switch C, to switch A, to brush 10, connected to brush 9, to block $H^{13}$, cross-connected to block $H^9$, to brush 7, to switch B, to field of motor No. 2, to reversing-switch C, to armature of motor No. 2, to reversing-switch C, to ground. With the circuits arranged as above the two motors are in series with the resistance out.

With the brushes on the line 4 4 the circuit will be as follows: trolley T, switches X and Y, to cut-out Z, to lightning-arrester W, to magnet M, to brush 1, to block H′, cross-connected to blocks $H^4$ and $H^6$. Here the circuit divides, one path being through brush 4, connected with brush 6, to switch A, to field of motor No. 1, and the other being through block $H^6$, to brush 5, to switch A, to loop on motor No. 1, through a part of the field, and uniting again with the main circuit to the reversing-switch C, to the armature of motor No. 1, to reversing-switch C, to switch A, to brush 10, connected to brush 9, to block $H^{13}$, where the circuit divides, one path being through block $H^9$, which is cross-connected to block $H^{13}$, to brush 7, to switch B, to field of motor No. 2, and the other through block $H^{13}$, cross-connected to block $H^{11}$, to brush 8, to

BEST AVAILABLE COPY switch B, to loop of motor No. 2, through a part of the field and uniting with the main circuit, to the reversing-switch C, to armature of motor No. 2, to reversing-switch C, to ground. With the brushes arranged as above the two motors are in series with the resistance out and a shunt placed around a portion of each motor-field.

With the brushes on the line 5 5 the circuit will be as follows: trolley T, switches X and Y, to cut-out Z, to lightning-arrester W, to magnet M, to brush 1, to block H′, cross-connected to block $H^3$, to brush 3, to resistance R′, to switch A, to field of motor No. 1, to reversing-switch C, to armature of motor No. 1, to reversing-switch C, to switch A, to brush 10 connected to brush 9, to block $H^{13}$, cross-connected to block $H^{11}$, to brush 8, to switch B, to loop of motor No. 2, through a part of the field, to reversing-switch C, to the armature of motor No. 2, to reversing-switch C, to ground. With the circuits arranged as above the resistance is partially out and motors No. 1 and No. 2 are in series with it and a part of the field of motor No. 2 is open-circuited.

With the brushes on the line 6 6 the circuit will be as follows: trolley T, switches X and Y, to cut-out Z, to lightning-arrester W, to magnet M, to brush 1, to block H′, cross-connected to block $H^3$, to brush 3, to resistance R′, to switch A, to field of motor No. 1, to reversing-switch C, to armature of motor No. 1, to reversing-switch C, to switch A, to brush 10, where the circuit divides, one path being through block $H^{14}$, cross-connected to block $H^{15}$, to brush 11, to ground, the other path being from brush 10 connected to brush 9, to block $H^{13}$, cross-connected to block $H^{11}$, to brush 8, to switch B, to loop of motor No. 2, through a portion of the field, to reversing-switch C, to armature of motor No. 2, to reversing-switch C, to ground. With the circuits arranged as above the resistance is partially out and motors No. 1 and No. 2 are in series with a part of the field of motor No. 2 open-circuited and a shunt placed completely around the motor, thus connecting motor No. 1 directly to ground.

With the brushes on the line 7 7 the circuit will be as follows: trolley T, switches X and Y, to cut-out Z, to lightning-arrester W, to magnet M, to brush 1, to block H′, cross-connected to block $H^3$, to brush 3, to resistance R′, to switch A, to field of motor No. 1, to reversing-switch C, to armature of motor No. 1, to reversing-switch C, to switch A, to brush 10, to block $H^{14}$, cross-connected to block $H^{15}$, to brush 11, to ground. With the circuits arranged as above the resistance is partially out and motor No. 1 is in series with it and connected directly to ground. Motor No. 2 is open-circuited.

With the brushes on the line 8 8 the circuit will be as follows: trolley T, switches X and Y, to cut-out Z, to lightning-arrester W, to magnet M, to brush 1, to block H′, cross-connected to block $H^3$, to brush 3, to resistance R′. Here the circuit divides, one path being to switch A, through field of motor No. 1, to reversing-switch C, to armature of motor No. 1, to reversing-switch C, to switch A, to brush 10, to block $H^{14}$, cross-connected to block $H^{15}$, to brush 11, to ground, and the other from R′ to brush 6, to block $H^8$, cross-connected to block $H^{10}$, to brush 7, to switch B, to field of motor No. 2, to reversing-switch C, to armature of motor No. 2, to reversing-switch C, to ground. With the circuits arranged as above the resistance is partially out and the two motors are connected in multiple.

With the brushes on the line 9 9 the circuit will be as follows: trolley T, switches X and Y, to cut-out Z, to lightning-arrester W, to magnet M, to brush 1, to block H′, cross-connected to block $H^5$, to brush 4 connected to brush 6, where the circuit divides, one path being to switch A, through field of motor No. 1, to reversing-switch C, to armature of motor No. 1, to reversing-switch C, to switch A, to brush 10, to block $H^{14}$, cross-connected to $H^{15}$, to brush 11, to ground, and the other from brush 6 to block $H^8$, cross-connected to block $H^{10}$, to brush 7, to switch B, to field of motor No. 2, to reversing-switch C, to armature of motor No. 2, to reversing-switch C, to ground. With the circuits arranged as above the resistance is out and the motors are connected in multiple.

With the brushes on the line 10 10 the circuit will be as follows: trolley T, switches X and Y, to cut-out Z, to lightning-arrester W, to magnet M, to brush 1, to block H′, cross-connected to block $H^5$, where the circuit divides, one path being through brush 4, connected to brush 6. Here the circuit divides again, the main circuit being to switch A, through the field of motor No. 1. Going back to where the circuit first divides at $H^5$, there is a shunt path which is connected to block $H^7$, to brush 5, to switch A, to loop on motor No. 1, through a part of the field, where it unites with the main circuit, to the reversing-switch C, to armature of motor No. 1, to reversing-switch C, to switch A, to brush 10, to block $H^{14}$, cross-connected to block $H^{15}$, to brush 11, to ground. Going back to block $H^5$, the circuit is as follows: block $H^5$, to brush 4 connected to brush 6, to block $H^8$, cross-connected to block $H^{10}$, and here the circuit divides again, the main path being through brush 7, to switch B, to field of motor No. 2, and the shunt path, from block $H^{10}$, cross-connected to block $H^{12}$, to brush 8, to switch B, to loop on motor No. 2, through a part of the field, and here it unites with the main circuit, to reversing-switch C, to armature of motor No. 2, to reversing-switch C, to ground. With the circuits arranged as above the resistance is out and motors No. 1 and No. 2 are in multiple, with a part of each field shunted. Thus

BEST AVAILABLE COPY it will be seen that the several conditions of the circuits indicated in Fig. 2 have been successively brought about by the rotation of the switch-cylinder.

It should be noted at this point that not all the circuit conditions of Fig. 2 are such that should be maintained for an indefinite period. Certain of these conditions are only temporary, which exist in passing from one to another of the conditions which may be comparatively permanent. The latter conditions correspond to those positions of the switch known as "running" positions—that is, they are conditions which afford successive regulating steps—and may be maintained so long as the driver desires to proceed at the rate of speed that these several conditions give. The other conditions correspond to what is known as "intermediate" conditions of the switch-cylinder and are conditions which should be maintained only for a short time while the switch is passing from one running position to another. In order that there shall be no uncertainty as to the running positions, I have so shaped the star-wheel Q, Fig. 4, that the several notches with which the friction-wheel $Q^2$ engages shall correspond to the running positions. Thus, referring to Fig. 2, the running positions are those numbered 1, 2, 3, 4, 8, 9, 10—5, 6, and 7 being intermediate positions. The wheel Q is therefore so shaped that there shall be no notch between the positions 4 and 8, and the driver will know that he is not to allow his switch-cylinder to remain for any length of time at the intermediate positions between 4 and 8, but is to turn until he feels that the friction-wheel $Q^2$ has dropped into a notch. In Fig. 4 the wheel $Q^2$ is in notch No. 10, which is the position giving the highest speed. An adjacent notch is provided into which the wheel drops when the motors are at rest with the circuit broken. It is of course impossible for the driver to pass directly from notch 10 to the "off" notch, as the one last described is designated, as there is a lug on the under side of the handle which engages with a projection on the top of the inclosing case, which stops the rotation, so that it is only possible to pass from notch 10 to the off notch by a reverse movement of the handle through the positions preceding 10 until the last or off position is reached.

In Fig. 18 I have shown a set of conditions which form a modification of those in Fig. 2, differing therefrom in respect to the method of changing the field-magnet strength, there being in the latter case a shunt containing a resistance connected between the terminals of the field-magnet to reduce the amount of current flowing in their coils, thereby reducing their magnetic strength.

In Fig. 19 I have shown a diagram indicating all of the circuits with the controlling-switch, it being understood that the diagram of Fig. 19 presupposes an arrangement in practice like that shown in Fig. 9; but it is not essential to indicate for a second time the car-body and the motors driving the respective axles. I have also shown in Fig. 19 a reversing-switch like that of Fig. 13, this switch being included in the same box with the controller-switch and of the same general construction—that is, there are a series of stationary contact-fingers connected to the circuit-terminals and a corresponding series of contact-plates on the cylinder, which serve to combine in any desired manner the circuits terminating at the contact-fingers. This modified series of circuit connections may be traced in detail with reference to Fig. 19 as follows:

With the brushes on the line 1 1 the circuit will be as follows: trolley T, to magnet M, to brush 1, contact-block H′, cross-connected to block $H^2$, to brush 2, to resistance R R′, switch A, to reversing-switch C contact 1′, armature of motor No. 1, to reversing-switch C contact 2′, to field of motor No. 1, to switch A, to brush 9, cross-connected to brush 8, to block $H^{11}$, cross-connected to block $H^7$, to brush 6, to switch B, to reversing-switch C contact 3′, to armature of motor No. 2, to reversing-switch C contact 4′, to switch B, to field of motor No. 2, to ground. With the circuit arranged as above the two motors are connected in series with full resistance.

With the brushes on the line 2 2 the circuit will be the same as above, except that a part of the resistance is out.

With the brushes on the line 3 3 the circuit will be as follows: trolley T, to magnet M, to brush 1, to block H′, cross-connected to block $H^4$, to brush 4 connected to brush 5, to switch A, reversing-switch C contact 1′, to armature of motor No. 1, to reversing-switch C contact 2′, to field of motor No. 1, to switch A, to brush 9 connected to brush 8, to block $H^{11}$, cross-connected to block $H^7$, to brush 6, to switch B, to reversing-switch C contact 3′, to armature of motor No. 2, to reversing-switch C contact 4′, to switch B, to field of motor No. 2, to ground. With the circuits arranged as above the motors are in series with the resistance all out.

With the brushes on the line 4 4 the circuit will be as follows: trolley T, to magnet M, to brush 1, to block H′, cross-connected to block $H^4$, to brush 4 connected to brush 5, to switch A, to reversing-switch C contact 1′, to armature of motor No. 1, to reversing-switch C contact 2′, to field of motor No. 1. Here the circuit divides, one path being through the field and the other through the shunt resistance S, to switch A, to brush 7, to block $H^9$. They unite again through the connection between brushes 9 and 8 and cross connection between blocks $H^7$, $H^9$, and $H^{11}$, cross-connected to block $H^7$, to brush 6, to switch B, to reversing-switch C contact 3′, to armature of motor No. 2, to reversing-switch C contact 4′, to switch B. Here the circuit divides

BEST AVAILABLE COPY again, one path being through field of motor No. 2 to ground, the other through shunt resistance S′, to brush 11, to block $H^{15}$, cross-connected to block $H^{13}$, to brush 10, to ground. With the circuit arranged as above the motors are in series with the resistance out and a resistance in shunt placed around each motor-field.

With the brushes on the line 5 5 the circuit will be as follows: trolley T, to magnet M, to brush 1, to block H′, cross-connected to block $H^3$, to brush 3, to resistance R′, to switch A, to reversing-switch C contact 1′, to armature of motor No. 1, to reversing-switch C contact 2′, to field of motor No. 1, to switch A, to brush 9 connected to brush 8, to block $H^{11}$, cross-connected to block $H^7$, to brush 6, to switch B, to reversing-switch C contact 3′, to armature of motor No. 2, to reversing-switch C contact 4′, to switch B, to field of motor No. 2, to ground. With the circuits arranged as above the two motors are in series with a part of the resistance out.

With the brushes on the line 6 6 the circuit will be as follows: trolley T, to magnet M, to brush 1, to block H′, cross-connected to block $H^3$, to brush 3, to resistance R′, to switch A, to reversing-switch C contact 1′, to armature of motor No. 1, to reversing-switch C contact 2′, to field of motor No. 1, to switch A, to brush 9. Here the circuit divides, one path being through brush 9, to block $H^{12}$, cross-connected to block $H^{14}$, to brush 10, to ground, and the other through brush 9 connected to brush 8, to block $H^{11}$, cross-connected to block $H^7$, to brush 6, to switch B, to reversing-switch C contact 3′, to armature of motor No. 2, to reversing-switch C contact 4′, to switch B, to field of motor No. 2, to ground. With the brushes arranged as above the resistance is partially out, motors No. 1 and No. 2 are connected in series with it, and a shunt is placed around motor No. 2.

With the brushes on the line 7 7 the circuit will be as follows: trolley T, to magnet M, to brush 1, to block H′, cross-connected to block $H^3$, to brush 3, to resistance R′, to switch A, to reversing-switch C contact 1′, to armature of motor No. 1, to reversing-switch C contact 2′, to field of motor No. 1, to switch A, to brush 9, to block $H^{12}$, cross-connected to block $H^{14}$, to brush 10, to ground. With the brushes arranged as above the resistance is partially out and motor No. 1 is connected in series with it to ground, leaving motor No. 2 open-circuited. The object of having this long step between 4 and 8 is to give time for the circuit to open when returning from multiple to series position, and thus avoid short-circuiting the motors. This step will be more clearly seen by referring to Sheet 1, where the star-wheel is shown which regulates the movement of the cylinder step by step.

With the brushes on the line 8 8 the circuit will be as follows: trolley T, to magnet M, to brush 1, to block H′, cross-connected to block $H^3$, to brush 3, to resistance R′. Here the circuit divides, one path being through brush 5, to block $H^6$, cross-connected to block $H^8$, to brush 6, to switch B, to reversing-switch C contact 3′, to armature of motor No. 2, to reversing-switch C contact 4′, to switch B, to field of motor No. 2, to ground. Going back to resistance R′ the other circuit is as follows: switch A, reversing-switch C contact 1′, to armature of motor No. 1, to reversing-switch C contact 2′, to field of motor No. 1, to switch A, to brush 9, to block $H^{12}$, cross-connected to block $H^{14}$, to brush 10, to ground. With the circuit arranged as above the two motors are connected in multiple with a part of the resistance out.

With the brushes on the line 9 9 the circuit will be as above, with the exception that all the resistance is out.

With the brushes on the line 10 10 the circuit will be as follows: trolley T, to magnet M, to brush 1, to block H′, cross-connected to block $H^3$, cross-connected to block $H^5$, to brush 4 connected to brush 5, where the circuit divides, one path being through switch A, reversing-switch C contact 1′, to armature of motor No. 1, to reversing-switch C contact 2′. Here the circuit divides again, one path being through field of motor No. 1, to switch A, to brush 9, to block $H^{12}$, cross-connected to block $H^{14}$, to brush 10, to ground, the other path being through shunt resistance S, to switch A, to brush 7, to block $H^{10}$, cross-connected to block $H^{14}$, to brush 10, to ground. Going back to brush 5, where the circuit first divides, the circuit will be as follows: brush 5, to block $H^6$, cross-connected to block $H^8$, to brush 6, to switch B, to reversing-switch C contact 3′, to armature of motor No. 2, to reversing-switch C contact 4′, to switch B, where the circuit divides again, one path being through field of motor No. 2, to ground, the other being through shunt resistance S′, to brush 11, to block $H^{16}$, cross-connected to block $H^{14}$, to brush 10, to ground. With the circuits arranged as above the two motors are connected in multiple with the resistance out and a resistance in shunt placed around each motor-field.

There remains to be described the cut-out switch by which either motor may be cut out of circuit and the cylinder automatically locked, so that it cannot be turned beyond the fourth notch, whereby the motor that is left in circuit is simply regulated by means of the resistance. These switches are marked A and B and are shown in front elevation in Fig. 1, where they are located on the back plate of the inclosing case at a point below the cylinder.

The diagrams of the circuit connections of the switches are shown in Figs. 8 and 20 for one form and in Fig. 19 for the other form of the controller.

The switch A, which cuts out motor No. 1,

BEST AVAILABLE COPY consists of three pivoted bars and a common handle therefor, and the switch B, which cuts out motor No. 2, is similarly constructed with two bars.

The switches are normally in the dependent positions shown in Fig. 1, in which case they have no influence upon the circuits. When it is desirable to operate either of them, they are lifted into a vertical position, as shown by the dotted lines in Fig. 8. When either switch is first lifted, it throws a stop into the path of rotation of the cylinder, and thus locks it so that it cannot be turned beyond the fourth notch. The mechanism of this lock is shown in Fig. 1 and more in detail in Fig. 3. In the latter figure $A^{10}$ is one of the bars of the switch and $A^{11}$ the handle. When the switch is in the elevated position shown, the handle comes into contact with a bolt $A^{12}$ and forces it inward, so that it forms a stop for an arm $A^{13}$, Figs. 1 and 3, on the shaft of the cylinder. The rotation of the cylinder will therefore be limited, as appears more clearly in Fig. 5, in such a manner that with one motor only in circuit it can only regulate that motor by means of the resistance.

In Fig. 13 is shown another form of lock, the details of which are illustrated in Fig. 17. Is this figure there is simply an intermediate lever between the handle $A^{11}$ and the bolt $A^{12}$. This intermediate piece is marked $A^{14}$. The outer end of piece $A^{14}$ is cam-shaped, so that the upward movement of the switch-bar and the consequent engagement of lever-handle $A^{11}$ with the cam-surface of $A^{14}$ forces the outer end of the said piece down and the inner end up, which acts thereby to put the bolt $A^{12}$ into the path of the arm $A^{13}$. When the form of switch which produces the circuit connections shown in Fig. 2 is employed, the circuit in detail will be as follows, it being understood that the switch A cuts out motor No. 1 and the switch B motor No. 2 in each instance.

With the switch A, Fig. 8, thrown up into position shown in dotted lines motor No. 1 will be cut out, and the cylinder can only revolve as far as the fourth notch on account of the lock. With the switch A arranged as above and the brushes on the line 1 1, Fig. 20, the circuit will be as follows: trolley T, switches X and Y, to cut-out Z, to lightning-arrester W, to magnet M, to brush 1, to block H′, cross-connected to block $H^2$, to brush 2, to resistance R R′, to middle pole of switch A, cross-connected to first pole, to brush 10, connected to brush 9, to block $H^{13}$, cross-connected to block $H^9$, to brush 7, to switch B, to field of motor No. 2, to reversing-switch C, to armature of motor No. 2, to reversing-switch C, to ground. Motor No. 2 is now connected in series with the resistance. With the switch B thrown up into position shown in dotted lines motor No. 2 is cut out and the lock prevents the cylinder from revolving beyond the fourth notch, the same as before, and the circuit with the brushes on the line 1 1 is as follows: trolley T, switches X and Y, to cut-out Z, to lightning-arrester W, to magnet M, to brush 1, to block H′, cross-connected to block $H^2$, to brush 2, to resistance R R′, to switch A, to field of motor No. 1, to reversing-switch C, to armature of motor No. 1, to reversing-switch C, to switch A, to brush 10, connected to brush 9, to block $H^{13}$, cross-connected to block $H^9$, to brush 7, to first pole of switch B, to ground. Motor No. 1 is now connected in series with the resistance.

With the other form of controller the details of the circuit are as follows: With the switch A, Fig. 19, thrown into the position shown in dotted lines motor No. 1 is cut out and the contact-cylinder can only revolve as far as the fourth notch on account of the lock. With the switch A arranged as above and the brushes on the line 1 1 the circuit is as follows: trolley T, to magnet M, to brush 1, to block H′, cross-connected to block $H^2$, to brush 2, to resistance R R′, to first pole of switch A, cross-connected to middle pole, to brush 9, connected to brush 8, to block $H^{11}$, cross-connected to block $H^7$, to brush 6, to switch B, to reversing-switch C contact 3′, to armature of motor No. 2, to reversing-switch C contact 4′, to switch B, to field of motor No. 2, to ground. With the switch B thrown up into position shown in dotted lines motor No. 2 is cut out and the lock prevents the cylinder from revolving beyond the fourth notch, the same as before, and the circuit with the brushes on the line 1 1 is as follows: trolley T, to magnet M, to brush 1, to block H′, cross-connected to block $H^2$, to brush 2, to resistance R R′, to switch A, to reversing-switch C contact 1′, to armature of motor No. 1, to reversing-switch C contact 2′, to field of motor No. 1, to switch A, to brush 9, connected to brush 8, to block $H^{11}$, cross-connected to block $H^7$, to brush 6, to first pole of switch B, to ground. Motor No. 1 is now connected in series with the resistance.

It is obvious that many matters of detail which I have shown in connection with my controller do not necessarily take the exact form which I have used for illustration, but may be altered in any way without departing from the spirit of my invention.

What I claim as new, and desire to secure by Letters Patent, is—

1. The combination in an electric controller, of a switch having a multiplicity of contacts, and a blow-out magnet having a common pole-piece extending from a common core to points adjacent to the several circuit-breaking points of the switch.

2. The combination in an electric controller, of a cylindrical switch having a series of insulated contact-plates adapted to engage with a corresponding series of stationary contact-fingers and a magnet having an extended pole-piece reaching to points adjacent to the several

BEST AVAILABLE COPY circuit-breaking points between the said fingers and the said plates.

3. The combination in an electric controller, of a switch having a series of contacts, and a blow-out magnet provided with a pivoted pole-piece reaching to points adjacent to the points of contact between the respective parts of the switch.

4. In a series-parallel controller, a cylinder carrying contacts and brushes bearing upon such contacts, the brushes having kinks or bends in their lengths; whereby the formation of grooves or furrows in the cylinder-contacts is prevented.

5. In a series-parallel controller, a series of contacts upon a cylinder, a series of fixed contacts coöperating with them and a series of insulating septa carried upon an arm and adapted to be interposed between the contacts, as described.

6. The combination in an electric controller, of a switch for connecting two motors either in series or in parallel, a reversing-switch for the motors, and a lock for each switch controlled by the remaining switch.

7. The combination in an electric controller, of a switch for connecting two motors, either in series or in parallel, a switch for reversing the motors, a lock for the former switch, and a connection between the said lock and the latter switch by which the former is held from moving while the latter is in its middle position.

8. The combination in an electric controller, of a switch for connecting two motors, either in series or in parallel, a reversing-switch, a lock for the latter switch, and a connection with the former switch whereby the latter is held against movement except when the former is in a position to put the two motors in series.

9. The combination in an electric controller, of a switch for putting two motors either in series or in parallel, a reversing-switch, an intermediate lock for the two switches, and a removable handle for the reversing-switch provided with a lock preventing its removal when in either of its extreme positions.

10. The combination with a switch, of a magnet having its poles adjacent to the contact-breaking points of the switch, and an arc-deflector also adjacent to the contact-breaking points of the switch, so placed that an arc between the contact-breaking points is driven against the same by the influence of the magnet.

11. The combination with a switch, of a magnet having its poles adjacent to contact-breaking points of the switch, a deflector located transversely to the line of the arc as driven by the influence of the magnet, and a chute or chimney for confining and conducting away the heated gases constituting said arc.

12. The combination with a switch, of a magnet having its poles adjacent to contact-breaking points of the switch, a transverse deflector against which an arc between the contact-breaking points is driven by the influence of the magnet, and a chute or chimney having walls placed transversely to the line of the arc for confining and conducting away the heated gases constituting said arc.

13. The combination with a switch having a multiplicity of contact-breaking points, of a magnet having its poles adjacent to said points, transverse deflectors against which the arcs between the contact-breaking points are driven by the influence of the magnet, and a series of chutes or chimneys for confining and carrying away the heated gases constituting said arcs.

14. The combination in an electric controller, of a switch having a multiplicity of contacts, a blow-out magnet provided with a pivoted pole-piece reaching to points adjacent to points of contact on said switch and an insulating structure fastened to said pole-piece, provided with walls inclosing each of said contacts and adapted to be swung outward from said contacts.

15. The combination in an electric controller, of a switch for connecting two motors, either in series or in parallel, a cut-out switch for connecting one terminal of the respective motors to the opposite line, and a stop for the series-parallel switch controlled by the cut-out switch.

16. The combination in an electric controller, of a switch for regulating two motors in series, and then changing them to parallel, a cut-out switch for each of the two motors, and a stop controlled by the cut-out switch for limiting the main switch to its regulating positions.

17. The combination in an electric controller, of a switch for regulating two electric motors in series by means of resistance, and subsequently putting them in parallel, of a cut-out switch for each motor having contacts arranged to leave the remaining motor in series with the said resistance.

18. The combination in an electric controller, of a switch for regulating two electric motors by means of a resistance, and then changing them from series to parallel, with a cut-out switch for each motor, a stop controlled by each of the two cut-out switches, limiting the movement of the main switch to those points at which the regulation by means of said resistance is effected.

In witness whereof I have hereunto set my hand this 7th day of June, 1904.

WILLIAM B. POTTER.

In presence of—

WM. H. DAVIS,

W. H. BERRIGAN.